Feb. 28, 1967 M. DOSEDLA ETAL 3,305,968
APPARATUS AND METHOD FOR THE SOILLESS
CULTIVATION OF SEEDLINGS AND PLANTS
Filed Jan. 18, 1965 5 Sheets-Sheet 1

INVENTOR.
Miroslav Dosedla
Ivo Pavelka
Otto Kirkaven
Michael J. Striker
Attorney

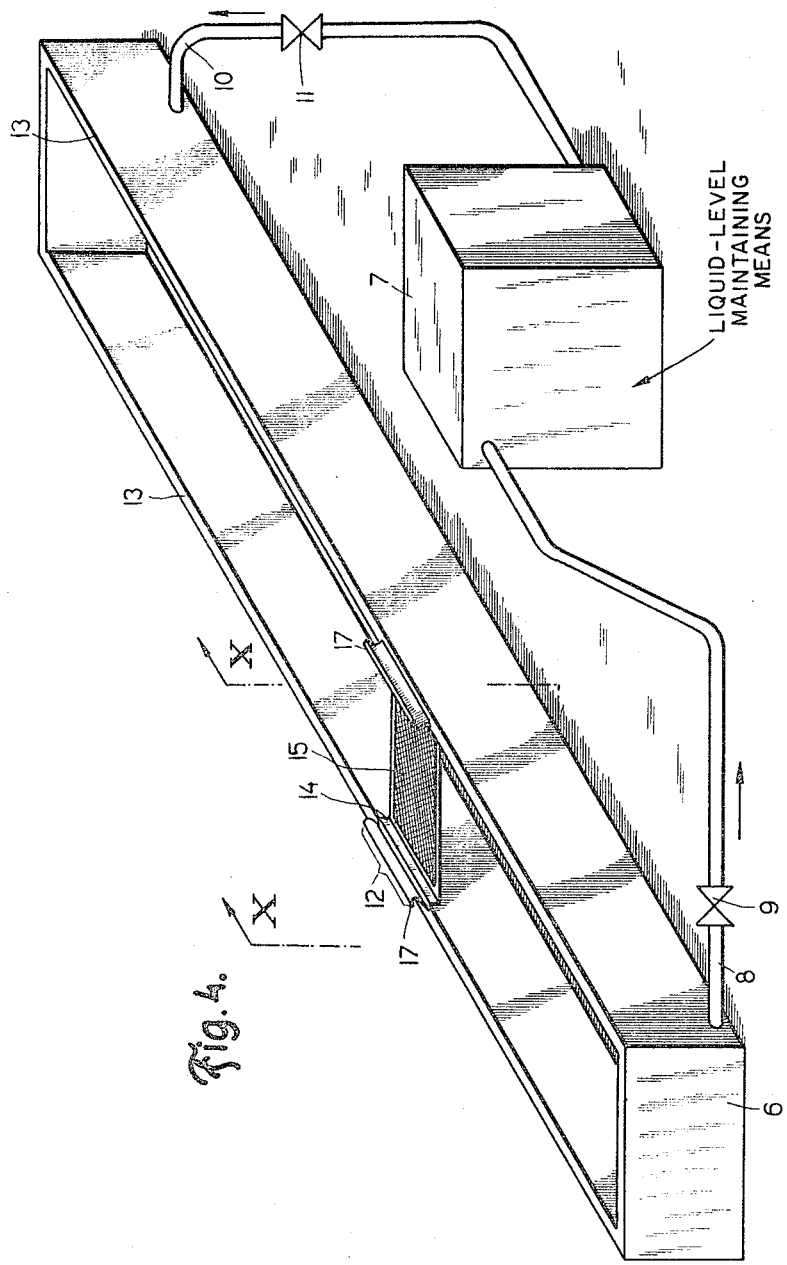

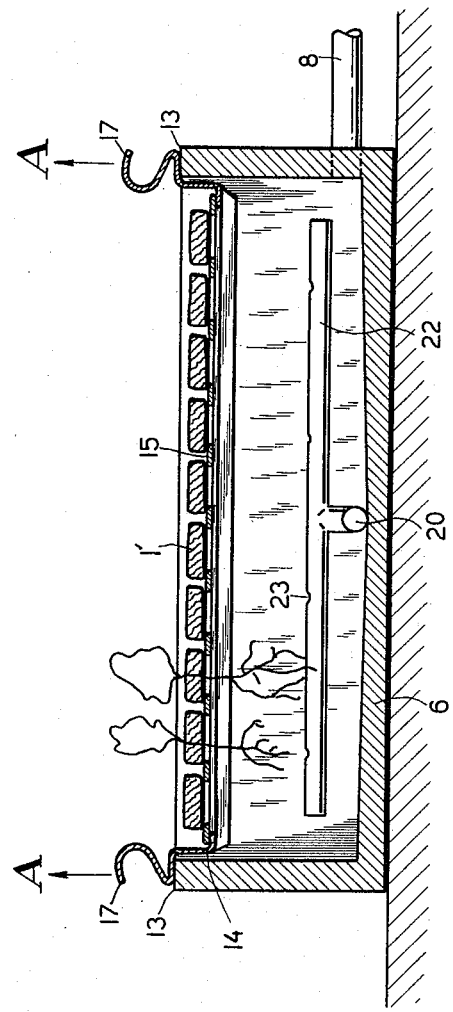

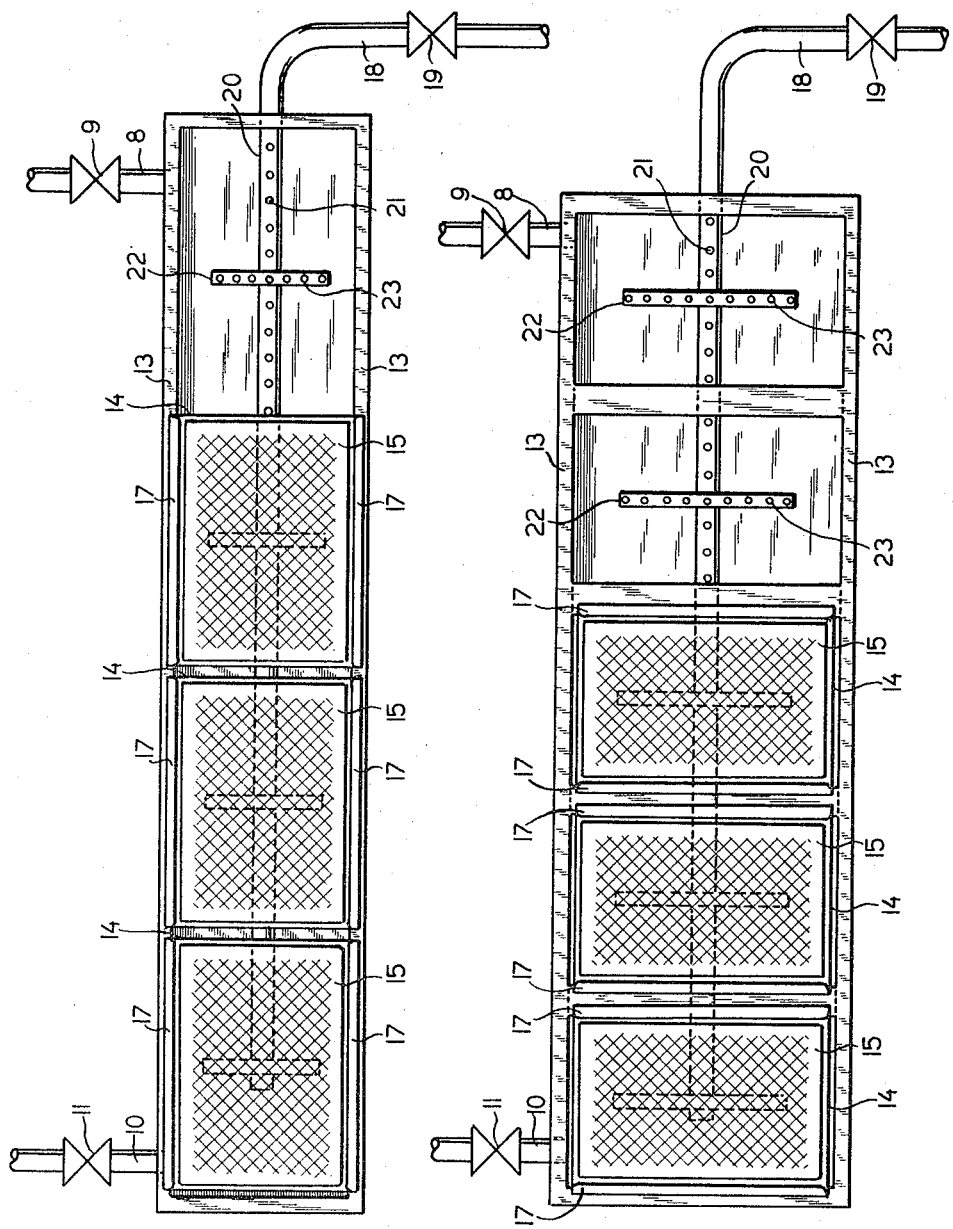

United States Patent Office 3,305,968
Patented Feb. 28, 1967

3,305,968
APPARATUS AND METHOD FOR THE SOILLESS CULTIVATION OF SEEDLINGS AND PLANTS
Miroslav Dosedla, Decin, Ivo Pavlica, Prague, and Otta Kokrhoun, Decin, Czechoslovakia, assignors to Roudnické Strojírny a Slévárny, narodní podnik, Roudnice nad Labem, Czechoslovakia
Filed Jan. 18, 1965, Ser. No. 426,198
Claims priority, application Czechoslovakia, Jan. 29, 1964, 513/64
7 Claims. (Cl. 47—1.2)

The present invention relates to an apparatus and method for the soilless cultivation of seedlings and plants, also known as the hydroponic system of plant cultivation and more particularly to the means and method by which an advantageous preliminary cultivation of seedlings and plants is achieved.

The conventional method of preliminary cultivation has heretofore been effected by planting the seeds into ordinary soil or on grids having small interstices and covered with a layer of soil. After germination the seedlings are either potted or pricked out. When the seedlings have reached the stage, in which they are suited for planting out, the soil has to be removed from their roots, which operation is performed usually by flotation. If grids are used for the preliminary cultivation of seedlings, it is a common experience that the roots, which have grown through the interstices in the grid, become entangled to such a degree, that their separation for the purpose of planting them out in the open is a tedious and delicate operation. Moreover, the use of a grid does not appear advantageous, as it does not provide any supporting or holding means for the plant during its growth. The above mentioned floating operation is connected with considerable expenses, as it requires skillful manual handling, the more so as the soil particles adhere firmly to the roots. Due to the fact, that the plants are in intimate contact with the soil, the possibility of their infection with noxious bacteria cannot be disregarded and, in addition, they are apt to become the carriers of harmful diseases. The heretofore employed methods of preliminary cultivation are connected with further considerable costs, when the plants are transplanted to the cultivation soil, which may consist for example of crushed basalt, tuff, sand, crushed bricks and the like.

Thus the preparation of seeds for preliminary cultivation and the treatment of seedling is carried out generally in an uneconomical manner unsuited for mechanisation, let alone automation. The conventional methods of preliminary cultivation, either in soil or in hydroponic media, require a great deal of manual labor, which means that a high percentage of the total costs of cultivation has to be paid out in wages.

It is therefore an object of the present invention to overcome the above mentioned difficulties and disadvantages.

A further object of the present invention is to provide a method and means for hydroponic plant cultivation ensuring a substantial reduction of costs as compared with the heretofore known methods.

It is another object of the present invention to provide means for hydroponic plant cultivation under strictly hygienic conditions.

Yet another object of the present invention is to provide means for hydroponic plant cultivation ensuring favorable conditions for the growth of the plants and darkness for the development of the root systems.

Still another object of the invention is to provide means for hydroponic plant cultivation, which are suited for mechanisation and even automation, while reducing the proportion of manual labor, the danger of damage to the plants and roots, though admitting the use of palletization or trays and a better utilization of transport facilities inside the greenhouse.

It is yet a further object of the present invention to provide means for hydroponic plant cultivation which are simple and efficient and which may be operated in a particularly simple and economical manner.

Other objects and advantages of the present invention will become apparent from a further reading of the description and of the appended claims.

With the above and other objects in view, as will more fully appear in the specification, the invention contemplates an apparatus for the soilless cultivation of seedlings and plants, comprising, in combination, a container having an upper edge; means for supplying a liquid growth promoting medium to the container and for withdrawing it therefrom; a supporting member removably mounted inside said container below its upper edge and formed with a series of openings therethrough; a pad adapted to receive the seed of a plant to be grown, said pad having an upper and a lower face and consisting essentially of vertically oriented layers of a resilient, liquid-absorbing material, said pad being located on and supported by said supporting member covering at least one of the openings therethrough, and means for maintaining the upper level of said liquid medium at a height below the upper edge of said container and between the upper and lower face of said pad.

The present invention is also concerned with a method for the soilless cultivation of seeds, seedlings and plants comprising the steps of placing a seed of a plant to be grown into a layer of a resilient liquid-absorbing material, supplying liquid adapted to cause germination of the seed and growthing of the thus produced seedling to the absorbing layer containing the seed thereby causing sprouting of roots downwardly through the layer and below, and of stem and leaf-forming portions upwardly through the layer and above, and supplying a liquid nutrient medium to the roots at a level below and spaced from the absorbing layer.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 4 is a perspective view showing an embodiment of an apparatus in which pallets or trays are used for supporting the seed carrying pads;

FIG. 5 is a cross-sectional view of the apparatus of the present invention taken along line X—X of FIG. 4;

FIG. 6 shows a plan view of the apparatus including pallets or trays which are mounted transversely on the container portion of the apparatus;

FIG. 7 is a similar view showing a longitudinal arrangement of the pallets or trays.

Figure 1:
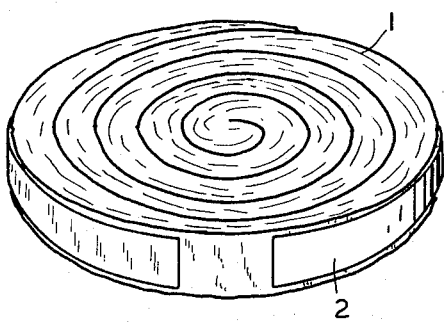
FIG. 1 is a perspective view of an embodiment of the invention showing a cultivation pad in which seeds may be embedded and forming part of the apparatus of the present invention.

Referring first to FIG. 1 a pad 1 is produced by winding one or more strips of cellulose cotton wool so as to form a circular body or disc, enclosed at its circumference by a clamp 2 made of a suitable resilient material, such as plastic, or sheet metal and having the shape of a split ring, which holds the wound layers of cotton wool in position.

Figure 2:
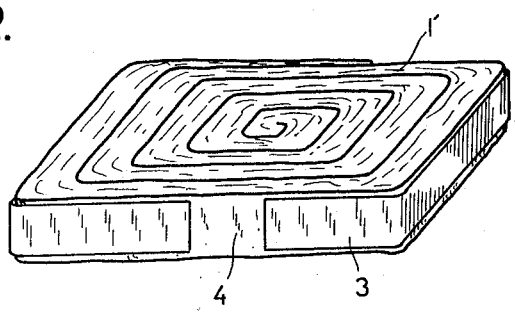
FIG. 2 shows, in a similar view, another embodiment of the pad.

FIG. 2 shows a modified embodiment of the pad, indicated by reference numeral 1', in which the pad is made again of one or more cotton wool strips, but wound or folded so as to produce a rectangular body, which is held in shape by a clamp 3, which—in this case—is of rectangular cross-section and open at one side, leaving an open space marked 4 in FIG. 2. This arrangement of the clamp 3 enables the same to be easily fitted on the wound or folded cotton wool layers.

Figure 3:
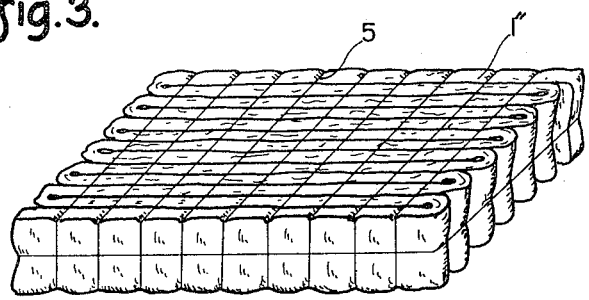
FIG. 3 illustrates in a similar view a further embodiment of the pad.

FIG. 3 represents a further modification of the pad, indicated by reference numeral 1'', which may be of any desired formation, round or angular, wherein the folded layers of cotton wool are held together by a loose net 5 which is tied around the pad or fixed thereon in any other suitable manner.

FIG. 4 shows an embodiment of an apparatus comprising a container 6, which receives the nutritious medium from a supply source 7 which is constructed to constitute a conventional liquid-level maintaining device and comprises a pump and a storage container (not shown) for the medium. The pump withdraws the medium from the container 6 through a pipeline 8 and control valve 9 to said storage container, from where the medium, after regeneration, filtration or other required treatment, is fed to the container 6, through the pipe 10 and control valve 11.

Figure 8:
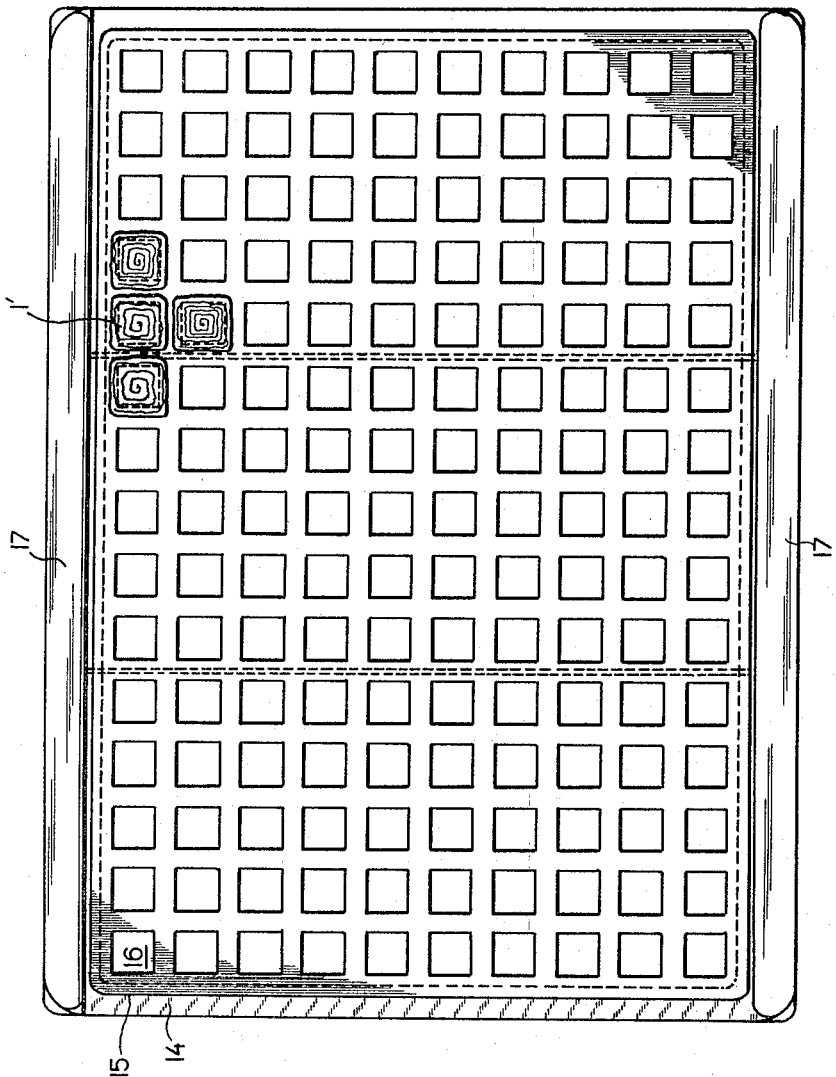
FIG. 8 is an enlarged, partial plan view of a pallet or tray, showing the same in greater detail.

Placed on top of the container 6 are trays or pallets 12. The top edges 13 of the container are adapted to support the pallet or tray frame 14. Each pallet or tray comprises a grid 15, shown in detail in FIG. 8, with relatively wide interstices or openings 16. The pallets or trays may be positioned on the container 6 either transversely, as shown in FIG. 6, or longitudinally, as shown in FIG. 7. Placed over the interstices or openings 16 are pads 1, made of cellulose cotton wool or peat and described in detail in connection with FIGS. 1 to 3. Seeds are embedded in each pad.

The arrangement of the pallets or trays and pads is illustrated in FIG. 5, from which it will be seen that the pads are placed closely to one another and the pallets are adapted for lifting out of the container 6 in the direction of arrows A, holders 17 being provided on the frame of each pallet or tray to facilitate its withdrawal.

FIGS. 5 and 6 show the arrangement of the pipelines supplying water or nutrient medium and air to the container 6. The pipes 8 and 10, withdrawing and feeding the liquid medium respectively, open near the bottom of the container 6. Another pipe 18, equipped with a control valve 19 and serving for the admission of air into the container, is attached to longitudinal pipe 20 lying at the bottom of the container 6. The tube 20 is provided with a series of openings 21 for the discharge of air. If necessary, transverse tubes 22 having discharge openings 23, may be connected to the longitudinal pipe 20 at suitable points along its length.

In operation, the pads with seeds pressed into the same from above are placed over the interstices provided in the pallets or trays, and are wetted with water of suitable temperature e.g. by sprinkling from above. Alternately, water may be admitted through pipe 10 to such a level as suffices for wetting the pads from below. The pallets or trays are bent downwards, so that their lower surface will lie below the top edge 13 of container 6.

After the seeds have germinated and their roots have grown through the interstices or pores into the container 6, the water is replaced by a nutrient solution which is fed into the container up to a required level. In accordance with the requirements of growth, the level of the nutrient solution is raised and lowered periodically and, at suitable periods, aerated by air admitted through the pipes 18 and 20.

The pads 1 are preferably made of cellulose cotton wool, but may be made also from peat or another suitable, resilient, liquid absorbing porous material arranged in such a way as to allow the roots to grow through it and to yield, when the stalk portion of the plant located within the pad becomes stronger and thicker.

It will be understood that each of the elements described above, or two or more together, may also find a useful application in other types of hydroponic apparatus differing from the types described above.

While the invention has been illustrated and described as embodied in an apparatus for the soilless cultivation of seeds, seedlings and plants, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

What we claim is:

1. An apparatus for the soilless cultivation of seedlings and plants, comprising, in combination, a container having an upper edge; means for supplying a liquid growth promoting medium to the container and for withdrawing it therefrom; a plurality of individual supporting members removably mounted inside said container below its upper edge and each formed with a series of openings therethrough; a plurality of individual shape-retaining pads each adapted to receive the seed of a plant to be grown and each having an upper and a lower face and consisting essentially of vertically oriented layers of a resilient, liquid-absorbing material, said pads each having a cross-sectional area larger than the respective openings and each being located on and supported by the upper face of said supporting member covering at least one of the openings therethrough; and means for maintaining the upper level of said liquid medium at a height below the upper edge of said container and between the upper and lower face of said pads.

2. An apparatus for the soilless cultivation of seedlings and plants, comprising, in combination, an open container having a top edge; means for introducing a growth promoting liquid medium into said container and for maintaining a predetermined upper level of said liquid medium in said container; a plurality of foraminous trays supported by the top edge of said container so as to at least partially cover the same and a plurality of individual shape-retaining pads supported by the upper faces of said trays and covering the respective foramena of the same and each consisting essentially of vertically oriented layers of resilient, liquid-absorbing material adapted to receive seeds of a plant to be grown; and means for forced aeration of said container downwardly of said trays.

3. An apparatus for the soilless cultivation of seedling and plants, comprising, in combination, an open container having a top edge; means for introducing a growth promoting liquid medium into said container and for maintaining a predetermined upper level of said liquid medium in said container; a plurality of foraminous trays supported by the top edge of said container so as to at least partially cover the same; a plurality of individual shape-retaining pads supported by the upper faces of said trays and covering the respective foramena of said trays and each consisting essentially of vertically oriented layers of resilient, liquid-absorbing material adapted to receive seeds of a plant to be grown; supply means coacting with said pads and extending downwardly below said predetermined upper level for supplying liquid medium from said container to said pads, and means for supplying and distributing air throughout the liquid medium in said container.

4. An apparatus for the soilless cultivation of seedlings and plants, comprising, in combination, an open container; means for introducing a growth promoting liquid medium into said container and for maintaining a predetermined upper level of said liquid medium in said container; a plurality of individual support members each with a plurality of openings therethrough at least substantially covering said container; a plurality of individual shape-retaining pads each adapted to receive the seed of a plant to be grown, each of said pads being supported by the upper face of one of said supporting members and covering at least one opening of said plurality of individual supporting members, said pads, respectively, consisting of vertically oriented layers of a spirally wound resilient liquid-absorbing material so as to form a circular disk-shaped body and of a split clamp surrounding said disk-shaped body of said pad along its circumference; and means for forced aeration of said container downwardly of said trays.

5. An apparatus for the soilless cultivation of seedlings and plants, comprising, in combination, an open container; means for introducing a growth promoting liquid medium into said container and for maintaining a predetermined upper level of said liquid medium in said container; a plurality of individual supporting members each formed with a plurality of openings therethrough at least substantially covering said container; a plurality of substantially rectangular individual shape-retaining pads each adapted to receive the seed of a plant to be grown, each of said pads being supported by the upper face of one of said supporting members and covering at least one opening of said plurality of individual supporting members, said pads, respectively, consisting of vertically oriented layers of a resilient liquid-absorbing material and of a split clamp surrounding said layers along the circumference of said rectangular pad; and means for forced aeration of said container downwardly of said trays.

6. An apparatus for the soilless cultivation of seedlings and plants, comprising, in combination, an open container; means for introducing a growth promoting liquid medium into said container and for maintaining a predetermined upper level of said liquid medium in said container; a plurality of individual supporting members each formed with a plurality of openings therethrough located on and at least substantially covering said container; a plurality of individual shape-retaining pads each adapted to receive the seed of a plant to be grown and consisting of vertically oriented layers of resilient, liquid absorbing material and a loose net enclosing said layers from all sides said pads being supported by the upper faces of said trays and each overlying one of said openings of the same.

7. A method for the soilless cultivation of seeds, seedlings and plants comprising the steps of placing a seed of a plant to be grown into a layer of a resilient liquid-absorbing material; supplying liquid adapted to cause germination of said seed and growing of the thus produced seedling to said absorbing layer containing said seed thereby causing sprouting of roots downwardly through said layer and below, and of stem and leaf-forming portions upwardly through said layer and above; and supplying a liquid nutrient medium to said roots at a level below and spaced from said absorbing layer.

References Cited by the Examiner

UNITED STATES PATENTS

| 1,057,877 | 4/1913 | Peeples | 47—14 |
| 1,279,310 | 9/1918 | Esslinger | 47—15 |
| 2,183,970 | 12/1939 | Meissl | 47—38.1 |
| 2,189,510 | 2/1940 | Swaney | 47—1.2 |
| 2,713,749 | 7/1955 | Hult | 47—1.2 |

ANTONIO F. GUIDA, *Acting Primary Examiner.*

ABRAHAM G. STONE, *Examiner.*

R. E. BAGWILL, *Assistant Examiner.*